United States Patent [19]
Ishii

[11] Patent Number: 5,206,844
[45] Date of Patent: Apr. 27, 1993

[54] MAGNETOOPTIC RECORDING MEDIUM CARTRIDGE FOR TWO-SIDED OVERWRITING

[75] Inventor: Yuwa Ishii, Kawasaki, Japan

[73] Assignee: Nikon Corporation, Tokyo, Japan

[21] Appl. No.: 743,122

[22] Filed: Aug. 9, 1991

[30] Foreign Application Priority Data

Sep. 7, 1990 [JP] Japan .................. 2-238328

[51] Int. Cl.[5] .............. G11B 13/04; G11B 11/10; G11B 11/12; G11B 23/03
[52] U.S. Cl. ......................... 369/13; 360/59; 360/114; 360/135; 360/137; 369/292
[58] Field of Search ............ 360/59, 114, 133, 135, 360/66, 60, 137, 131; 369/13, 14, 284, 286, 292, 275.5

[56] References Cited

U.S. PATENT DOCUMENTS

| 4,908,809 | 3/1990 | Tadokoro et al. | 369/13 |
| 4,910,622 | 3/1990 | Saito et al. | 360/131 |
| 5,088,074 | 2/1992 | Sato | 360/59 |

FOREIGN PATENT DOCUMENTS

| 61-11977 | 1/1986 | Japan | 369/13 |
| 62-175948 | 8/1987 | Japan | . |
| 63-148446 | 6/1988 | Japan | . |
| 1-46247 | 2/1989 | Japan | 369/13 |
| 1-46248 | 2/1989 | Japan | 369/13 |
| 1-155538 | 6/1989 | Japan | . |

OTHER PUBLICATIONS

Swartz et al, "Stabilized Biasing of Semiconductor Lasers," *The Bell Systems Technical Journal*, Sep. 1983, vol. 62, No. 7, Part 1, pp. 1923–1936.

*Primary Examiner*—Hoa Nguyen
*Attorney, Agent, or Firm*—Shapiro and Shapiro

[57] ABSTRACT

A magnetooptic recording medium cartridge which accommodates a double face type disk-like magnetooptic recording medium with which an overwriting can be performed by modulating only the intensity of a laser beam in accordance with two-valued information to be recorded, without modulating a recording magnetic field. The cartridge has two initial auxiliary magnetic field (Hini.) applying devices adapted to produce magnetic fields directed opposite to each other.

2 Claims, 12 Drawing Sheets

| FIRST LAYER : RECORDING LAYER |
|---|
| SECOND LAYER : REFERENCE LAYER |

| FIRST LAYER | ⇧⇩⇩⇧⇩⇧⇩⇩* |
|---|---|
| SECOND LAYER | ⇧⇧⇧⇧⇧⇧⇧⇧ |

MAGNETOOPTIC RECORDING MEDIUM CARTRIDGE FOR TWO-SIDED OVERWRITING

BACKGROUND OF THE INVENTION

Field of the Invention

The present invention relates to an improvement in a magnetooptic recording medium cartridge for accommodating a disk-like magnetooptic recording medium which is capable of an overwriting by modulating only the intensity of a laser beam in accordance with two-valued information to be recorded, without modulating a recording magnetic field.

Related Background Art

Recently, endeavors have been concentrated on developing an optical recording and reproducing method which can satisfy various requirements such as high density, large capacity, high access speed, and high recording and reproducing speed, as well as recorders, reproducers and recording media for use with the method.

Among a variety of optical recording and reproducing methods, a magnetooptic one is most attractive or promising because of the unique advantage that information can be erased after recording and new information can be recorded again after erasing in a repeatable way.

A recording medium for use with the magnetooptic recording and reproducing method has one or more layers of perpendicular magnetic films as recording layers. These magnetic layers are each formed of, for example, amorphous GdFe, GdCo, GdFeCo, TbFe, TbCo or TbFeCo. Generally, the recording layer has spiral or concentric tracks on which information is to be recorded. In this specification, either the "upward" or "downward" direction relative to the layer surface is defined as "an A direction" and the other is defined as "a counter-to-A direction". Information to be recorded is binary-coded or two-valued beforehand and recorded by two signals; i.e., a bit ($B_1$) magnetized in "the A direction" and a bit ($B_0$) magnetized in "the counter-to-A direction". These bits $B_1$, $B_0$ correspond to states 1 and 0 of a digital signal, or vice versa, respectively. In general, however, tracks on which information is to be recorded are magnetized uniformly in "the counter-to-A direction" by applying a strong external magnetic field before the recording. This process is called initialization. Following that, the bit ($B_1$) magnetized in "the A direction" is formed on the track. Information is recorded depending on the presence or absence of the bit ($B_1$) and/or the bit length thereof. Note that the bit is lately referred to as "a mark".

PRINCIPLES OF BIT FORMATION

The formation of bits advantageously utilizes a feature of lasers, i.e., remarkable coherence in the spatial and temporal terms, so that a laser beam is condensed to a small spot very close to a diffraction limit determined by the wavelength of the laser beam. The condensed beam is irradiated to the track surface and a bit having a diameter less than 1 μm is formed in a recording and reproducing layer to thereby record information. Theoretically, the recording density up to about $10^8$ bits/cm$^2$ can be achieved in the optical recording. It is because a laser beam can be concentrated to a spot having a diameter almost as small as the wavelength of the laser beam.

In the magnetooptic recording, as shown in FIG. 1, a laser beam (L) is condensed onto a recording layer (1) for heating it. During irradiation of the laser beam, a recording magnetic field (Hb) in a direction opposite to the initialized direction is externally applied to the heated area. This reduces the coercivity Hc in the locally heated area less than the recording magnetic field (Hb). As a result, the irradiated area is magnetized in the same direction as the recording magnetic field (Hb). The reversely magnetized bit is thus formed.

Ferromagnetic and ferrimagnetic materials are different in dependency of magnetization and $H_C$ on temperatures. Ferromagnetic materials have $H_C$ which is reduced in the vicinity of the Curie point, and the recording is carried out based on such a phenomenon. This recording process is therefore called a $T_C$ writing (Curie-point writing).

On the other hand, ferrimagnetic materials have a compensation temperature lower than the Curie point at which an extent of magnetization (M) becomes zero. Conversely, $H_C$ has a very large value in the vicinity of the compensation temperature and is abruptly lowered in a range deviated from the compensation temperature. Such lowered $H_C$ can be overcome by a relatively weak level of the recording magnetic field (Hb). Thus, the recording can be enabled. This recording process is therefore called a $T_{comp.}$ writing (Compensation-point writing).

However, it is not necessarily required to stick to the Curie point or thereabout and the vicinity of the compensation temperature. In essence, the recording is enabled by applying a magnetic material, which has the lowered $H_C$ at a predetermined temperature higher than the room temperature, with the recording magnetic field (Hb) enough to overcome the lowered $H_C$.

PRINCIPLES OF REGENERATION

FIG. 2 shows the principles of reproducing information based on the magnetooptic effect. Light is an electromagnetic wave having a vector of the electromagnetic field which is normally divergent in all directions on the plane perpendicular to an optical path. An emitted light is converted into a linearly polarized light (Lp) and, when irradiated to a recording layer (1), it is reflected by the surface of a recording layer (1) or passes therethrough. At this time, the polarized plane is rotated depending on the direction of the magnetization (M). This phenomenon is called a magnetic Kerr effect or a magnetic Faraday effect.

For example, if the polarized plane of the reflected light is rotated by an angle of $\theta k$ for the magnetization in "the A direction", it is rotated by an angle of $-\theta k$ for the magnetization in "the counter-to-A direction". Accordingly, when a light analyzer (polarizer) is set such that its axis is perpendicular to the plane inclined by the angle of $\theta k$, the light reflected by the bit ($B_0$), which is magnetized in "the counter-to-A direction", cannot pass through the analyzer. As regards to the light reflected by the bit ($B_1$) which is magnetized in "the A direction", its component resulted from multiplication of $(\sin 2\theta k)^2$ can pass through the analyzer and is captured by a detector (photoelectric conversion means). As a result, the bit ($B_1$) magnetized in "the A direction" looks brighter than the bit ($B_0$) magnetized in "the counter-to-A direction", causing the detector to generate a stronger electric signal. Since this electric signal is modulated in accordance with the recorded information, it is possible to reproduce the information.

Meanwhile, reuse of media on which information has already been recorded requires to (i) initialize the media again by using an initializing device, (ii) additionally provide an erasing head similar to a recording head on recorders, or (iii) erase the recorded information beforehand by using recorders or erasers as preprocessing.

To date, it has been therefore regarded that an in situ overwriting able to record new information is impractical with the magnetooptic recording technique regardless of the presence or absence of the recorded information.

Really, if the direction of the recording magnetic field Hb can be freely changed, on demand, between "the A direction" and the "counter-to-A direction", the overwriting could be achieved. It is, however, infeasible to change the direction of the recording magnetic field Hb at a high speed. For example, if means for applying the recording magnetic field Hb is a permanent magnet, the magnet must be mechanically reversed in its orientation. But reversing the orientation of the magnet at a high speed is unpracticable. If the means for applying the recording mangetic field Hb is an electromagnet, it is also impossible to change the direction of a current of large capacity at a high speed.

In view of the above, we have previously invented a magnetooptic recording medium and a recording apparatus and method which can perform an overwriting by modulating only the intensity of a laser beam in accordance with two-valued information to be recorded, without the need of turning on and off the recording magnetic field Hb or changing the direction of the recording magnetic field Hb (Japanese Patent Laid-Open No. 62-175948, corresponding to U.S. Ser. No. 453,255 filed on Dec. 20, 1989). Hereinafter, this invention will be referred to as "a basic invention".

EXPLANATION OF BASIC INVENTION

The basic invention employs a multi-layered magnetooptic recording medium comprising at least two layers stacked one above the other; i.e., a first layer having, as a recording layer, a magnetic thin film which can be perpendicularly magnetized, and a second layer having, as a reference layer, a magnetic thin film which can be perpendicularly magnetized. Depending on cases, to reduce an exchange coupling force $\sigma w$ acting between the first and second layers, an exchange coupling force adjust layer (e.g., a non-magnetic layer) may be inserted therebetween, or a layer (a third or fourth layer) for reducing the exchange coupling force $\sigma w$ may be provided adjacent to the second layer. Then, information is recorded in the first layer (as well as the second layer in some cases) by using a bit magnetized in "the A direction" and a bit magnetized in "the counter-to-A direction".

With such a medium, the second layer can be uniformly magnetized in "the A direction" by means of applying an initial auxiliary magnetic field Hini. and, at this time, the first layer is not reversed in the direction of magnetization. Further, the direction of magnetization of the second layer, which has been once aligned with "the A direction", will not be reversed even upon receiving the exchange coupling force from the first layer. Conversely, the direction of magnetization of the first layer will not be reversed even upon receiving the exchange coupling force from the second layer which has been uniformly magnetized in "the A direction".

The second layer has a lower coercivity and a higher Curie point Tc than the first layer.

According to the recording method of the basic invention, prior to recording, the second layer of the recording medium is uniformly magnetized in "the A direction" by the initial auxiliary magnetic field (Hini.) applying means. This operation will be referred to especially as "initialization" in this specification.

Then, a laser beam pulse-modulated in accordance with two-valued information (binary data) is irradiated to the medium. The intensity of the laser beam consists of a high and low level which respectively correspond to a high and low level of the pulse. Note that this low level is higher than a very low level* used in irradiation to the medium for reproduction.

A portion of the medium irradiated by the beam is subjected to the recording magnetic field Hb modulated in neither direction nor intensity. The magnetic field Hb cannot be condensed to the size as small as the portion (spot area) irradiated by the beam and, therefore, the area coming under an action of Hb is much greater than the spot area.

When the beam of low level is irradiated, a bit is formed to magnetize the first layer in either "the A direction" or "the counter-to-A direction" regardless of the direction of magnetization of the preceding bit.

When the beam of high level is irradiated, a bit is formed to magnetize the first layer in the other direction regardless of the direction of magnetization of the preceding bit.

An overwriting is thereby completed.

In the basic invention, the laser beam is pulse-modulated in accordance with information to be recorded. However, this technique has been per se practiced in the prior art of photomagnetic recording, and means for pulse-modulating the beam intensity in accordance with two-valued information to be recorded is known. One example of such means is described in detail in THE BELL SYSTEM TECHNICAL JOURNAL, Vol. 62 (1983), 1923–1936. Accordingly, if the high and low levels necessary for the beam intensity are given, that type means can be easily obtained just by modifying part of conventional modulation means. Such a modification will be readily made to those skilled in the art with the high and low levels of the beam intensity given.

One of features of the basic invention is that the beam intensity has a high and low level. More specifically, when the beam intensity is at a high level, the reference layer (second layer) is reversed in magnetization from "the A direction" to "the counter-to-A direction" by the recording magnetic field Hb, so that a bit magnetized in "the counter-to-A direction" [or "the A direction"] is formed in the recording layer (first layer) upon the magnetization of the second layer in "the counter-to-A direction". When the beam intensity is at a low level, a bit magnetized in "the A direction" [or "the counter-to-A direction"] is formed in the first layer upon the magnetization of the second layer in "the A direction".

Here, the expression 000[or △△△] in this specification should be construed such that when 000 outside [] is first read, the following 000[or △△△] is also read from 000 outside []. On the contrary, when △△△ inside [] is selected to be first read instead of 000, the following 000[or △△△] is also read from △△△ inside [] instead of 000.

As already known, other than the recording, the laser beam may be lit up at a very low level* for the purpose of accessing to a predetermined record location in the medium, by way of example. Further, when the laser beam is also used for reproduction, the laser beam may be lit up with the intensity of very low level*. In the present invention as well, the intensity of the laser beam may be set to the very low level*. However, the low level used in forming bits is higher than the very low level*. Accordingly, the output waveform of the laser beam in the basic invention is, for example, as shown in FIG. 3.

Though not disclosed in the specification of the basic invention, it is alternatively possible in the basic invention to use two recording beams close to each other instead of a single beam such that, as a general rule, the leading beam gives a laser beam (for erasing) of low level which is not modulated and the trailing beam gives a laser beam (for writing) of high level which is modulated in accordance with information. In this case, the trailing beam is pulse-modulated between a high level and a basis level (which is equal to or lower than a low level and may have an output of zero). The output waveform in this case is as shown in FIG. 4.

Recording media used in the basic invention are mainly grouped into one type of the first embodiment and the other type of the second embodiment. In either embodiment, the recording medium has a multi-layered structure comprising a recording layer (first layer) and a reference layer (second layer), as shown in FIG. 5.

The first layer is a recording layer which exhibits a high coercivity at the room temperature and a low magnetization reversing temperature. The second layer is a reference layer which exhibits a relatively lower coercivity at the room temperature and a relatively higher magnetization reversing temperature than the first layer. Each of the first and second layers may be in itself formed of a multi-layered film. Depending on cases, a third layer may be present between the first and second layers. In addition, the first and second layers may not be divided by a definite boundary, and may be gradually transformed from one to the other.

Assuming that the coercivity of the recording layer (first layer) is $H_{C1}$, the coercivity of the reference layer (second layer) is $H_{C2}$, the Curie point of the first layer is $T_{C1}$, the Curie point of the second layer is $T_{C2}$, the room temperature is $T_R$, the temperature of the recording medium when irradiated by the laser beam of low level is $T_L$, the temperature of the recording medium when irradiated by the laser beam of high level is $T_H$, the coupling magnetic field acting on the first layer is $H_{D1}$, and the coupling magnetic field acting on the second layer is $H_{D2}$, the recording medium of the first embodiment satisfies the following equation (1) and also the following equations (2) to (5) at the room temperature:

$$T_R < T_{C1} \approx T_L < T_{C2} \approx T_H \tag{1}$$

$$H_{C1} > H_{C2} + |H_{D1} \mp H_{D2}| \tag{2}$$

$$H_{C1} > H_{D1} \tag{3}$$

$$H_{C2} > H_{D2} \tag{4}$$

$$H_{C2} + H_{D2} < |Hini.| < H_{C1} \pm H_{D1} \tag{5}$$

In the above equations, the symbol "$\approx$" indicates that both the terms are equal or substantially equal (about ±20° C.) to each other. As to the composite symbols $\pm$ and $\mp$, the upper symbols indicate media of A (antiparallel) type, described later, and the lower symbols indicate media of P (parallel) type, also described later. Note that ferromagnetic media belong to the P type.

Namely, the relationship between the coercivity and the temperature of the first and second layers can be graphed as shown in FIG. 6. A thin line represents the relationship of the first layer and a fat line represents the relationship of the second layer.

Accordingly, if external means such as an initial auxiliary magnetic field (Hini.), for example, is applied to the recording medium at the room temperature, the direction of magnetization of the recording layer (first layer) is not reversed and only the direction of magnetization of the reference layer (second layer) is reversed, as seen from the equation (5). By applying the initial auxiliary magnetic field (Hini.) to the medium before the recording, only the second layer can be magnetized in "the A direction"—on the drawing sheets, "the A direction" is indicated by an upward arrow ⇧ and "the counter-to-A direction" is indicated by a downward arrow ⇩ for convenience. Even after Hini. becomes zero, the magnetization ⇧ of the second layer will not be reversed again and remain as it is, as seen from the equation (4).

FIG. 7 conceptually shows a condition that only the second layer is magnetized by the external means in "the A direction" ⇧ immediately before the recording.

In FIG. 7, the direction * of magnetization of the first layer represents the information recorded until then. Since the following description is applied regardless of the direction of magnetization of the first layer until then, that direction will be denoted by X below. The description will now proceed by referring to FIG. 8.

Under a condition 1, the laser beam of high level is irradiated to raise the medium temperature up to $T_H$. Since $T_H$ is higher than the Curie point $T_{C1}$, the magnetization of the recording layer (first layer) is thereby disappeared. In addition, since $T_H$ is near the Curie point $T_{C2}$, the magnetization of the reference layer (second layer) also completely or substantially disappears. The recording magnetic field (Hb) is now applied in "the A direction" or "the counter-to-A direction" depending on the type of medium. The recording magnetic field (Hb) may be a stray magnetic field from the medium itself. For simplicity of the explanation, it is supposed that the recording magnetic field in "the counter-to-A direction" is applied. Because of the medium being moved, the irradiated portion immediately goes away from the laser beam to be cooled. As the medium temperature is lowered under the presence of Hb, the magnetization of the second layer is reversed in accordance with Hb and magnetized in "the counter-to-A direction" (condition $2_H$).

When the medium temperature is lowered slightly beyond $T_{C1}$ with continued cooling, the magnetization of the first layer appears again. At this time, the direction of magnetization of the first layer is affected by the direction of magnetization of the second layer due to a magnetic coupling (exchange coupling) force. In other words, the first layer is magnetized in the stable direction. As a result, the first layer exhibits the magnetization ⇩ (for the medium of P type) or the magnetization ⇧ (for the medium of A type) depending on the type of medium (condition $3_H$).

Such a change in the condition by the laser beam of high level is here called a high temperature cycle.

Next, as shown in FIG. 9, the laser beam of low level is irradiated to raise the medium temperature up to $T_L$. Since $T_L$ is near the Curie point $T_{C1}$, the magnetization of the first layer completely or substantially disappears. But, since $T_L$ is lower than the Curie point $T_{C2}$, the magnetization of the second layer does not disappear (condition $2_L$).

Although the recording magnetic field (Hb) is not required in this case, it is impossible to turn on and off Hb at a high speed (or in a short period of time). Accordingly, the recording magnetic field is obliged to remain applied similarly to the high temperature cycle.

However, since $H_{C2}$ is still large, the magnetization of the second layer will not be reversed by Hb. Because of the medium being moved, the irradiated portion immediately goes away from the laser beam to be cooled. With continued cooling, the magnetization of the first layer appears again. The direction of magnetization appeared in the first layer is affected by the direction of magnetization of the second layer due to a magnetic coupling force. In other words, the first layer is magnetized in the stable direction. As a result, the first layer exhibits the magnetization ⇧ (for the medium of P type) or the magnetization ⇩ (for the medium of A type) depending on the type of medium (condition $3_L$). This magnetization is not changed even at the room temperature.

Such a change in the condition by the laser beam of low level is here called a low temperature cycle.

As described above, regardless of the direction of magnetization of the first layer, bits having the magnetization ⇧ and ⇩ opposite to each other are formed through the high temperature cycle and the low temperature cycle, respectively. Stated other wise, an overwriting can be enabled by pulse-modulating a laser beam between a high level (high temperature cycle) and a low level (low temperature cycle) in accordance with information.

FIGS. 10 and 11 respectively show how the direction of magnetization of the medium is changed through the low and high temperature cycles for each of the P and A types of medium, respectively. In these drawings, the final condition in each cycle represents the condition at the room temperature.

The foregoing explanation was made on the first and second layers both having the composition of magnetic material which exhibits no compensation temperature $T_{comp.}$ between the room temperature and the Curie point. In the presence of the compensation temperature $T_{comp.}$, the more complex explanation will be needed because of the facts that when the medium temperature exceeds the compensation temperature $T_{comp.}$, (1) the direction of magnetization is reversed and (2) the A and P types of medium operate in opposite manners to each other. In this case, the direction of the recording magnetic field Hb is also reversed as compared with the direction ↓ stated above when considering conditions at the room temperature. Thus, Hb having the same direction ↑ of magnetization of the second layer, which has been aligned in "the initialization", is applied.

The recording medium generally has a disk-like shape and is rotated during the recording. Therefore, the recorded portion (bit) is subjected again to the external means such as Hini., for example, each time the medium comes around, whereby the magnetization of the second layer is aligned to the original "A direction" ⇧. At the room temperature, however, the magnetization of the second layer will not affect the first layer and hence the recorded information is held as it is.

Accordingly, if a linearly polarized light is irradiated to the first layer, the reflected light from the first layer includes information so that the information can be reproduced as with the conventional magnetooptic recording medium. Depending on the composition design of the first and second layers, it becomes possible to transfer the information in the first layer to the second layer, which is uniformly magnetized in the original "A direction" ⇧, by applying a reproduction magnetic field $H_R$ before the reproduction, or to allow the information in the first layer to be spontaneously transferred to the second layer as soon as an influence of Hini. is eliminated, with no need of applying the reproduction magnetic field $H_R$. In either case, the information may be reproduced from the second layer.

Perpendicular magnetic films constituting the recording layer (first layer) and the reference layer (second layer) are each selected from a group consisting of (1) ferromagnetic and ferrimagnetic materials which have not the compensation temperatures, but the Curie points, and (2) ferrimagnetic materials which have both the compensation temperatures and the Curie points, the above materials being in the amorphous or crystalline form.

The foregoing explanation is concerned with the first embodiment utilizing the Curie point as a magnetization reversing temperature. On the contrary, the second embodiment utilizes $H_C$ which is lowered down to a predetermined temperature higher than the room temperature. The second embodiment can be described in a like manner to the first embodiment by using a temperature $T_{S1}$ at which the recording layer (first layer) is magnetically coupled to the reference layer (second layer), in place of $T_{C1}$ in the first embodiment and by using a temperature $T_{S2}$ at which the magnetization of the second layer is reversed by Hb, in place of $T_{C2}$.

Assuming that the coercivity of the first layer is $H_{C1}$, the coercivity of the second layer is $H_{C2}$, the temperature at which the first layer is magnetically coupled to second layer is $T_{S1}$, the temperature at which the magnetization of the second layer is reversed by Hb is $T_{S2}$, the room temperature is $T_R$, the temperature of the recording medium when irradiated by the lase beam of low level is $T_L$, the temperature of the recording medium when irradiated by the laser beam of high level is $T_H$, the coupling magnetic field acting on the first layer is $H_{D1}$, and the coupling magnetic field acting on the second layer is $H_{D2}$, the recording medium of the second embodiment satisfies the following equation (6) and also the following equations (7) to (10) at the room temperature:

$$T_R < T_{S1} \approx T_L < T_{S2} \approx T_H \qquad (6)$$

$$H_{C1} > H_{C2} + |H_{D1} \mp H_{D2}| \qquad (7)$$

$$H_{C1} > H_{D1} \qquad (8)$$

$$H_{C2} > H_{D2} \qquad (9)$$

$$H_{C2} + H_{D2} < |\text{Hini.}| < H_{C1} \pm H_{D1} \qquad (10)$$

In the above equations, as to the composite symbols ± and ∓, the upper symbols indicate media of A (antiparallel) type, described later, and the lower symbols indicate media of P (parallel) type, also described later. Note that ferromagnetic media belong to the P type.

In the second embodiment, at the high temperature $T_H$, the magnetization of the second layer does not disappear but is sufficiently weak, and the magnetization of the first layer is disappears or is sufficiently weak, as shown in FIG. 12. Even with the magnetization of both the first and second layers both remaining at a sufficiently weak level, the recording magnetic field Hb ↓ is so sufficiently large that Hb ↓ causes the direction of magnetization of the second layer and, in some cases, the first layers to follow Hb ↓ (condition $2_H$).

Afterward, (1) immediately, (2) when the irradiation of the laser beam is ceased and the medium temperature is lowered down beyond $T_H$, or (3) when the medium goes away from Hb, the second layer affects the first layer due to σw (exchange coupling force), making the direction of magnetization of the first layer to follow in the stable direction. As a result, a condition $3_H$ is obtained. If the bit in the first layer is magnetized in the stable direction under the previously recorded condition, the direction of magnetization of the first layer will not be changed.

On the other hand, at the low temperature $T_L$, the magnetization of both the first and second layer does not disappear, but the magnetization of the first layer is sufficiently weak (condition $2_{L'}$), as shown in FIG. 13.

In this case, there are two types of bit as shown in FIG. 14. The description will be made by taking the P type as an example.

In a right-hand condition $\underline{2_{L'}\text{-}2}$, a magnetic wall (indicated by a fat line) is caused between the first and second layers, bringing about a somewhat unstable (metastable) condition. Specifically, the direction of magnetization of the first layer is affected by the exchange coupling force σw from the second layer greater than Hb. Note that since the second layer is sufficiently magnetized, its magnetization will not be reversed by Hb.

Therefore, if the temperature of the first layer is raised to some extent not up to the Curie point. $T_{C1}$ at which the magnetization of the first layer disappears, and the coercivity $H_{C1}$ is lowered, the magnetization of the first layer follows in the stable direction. Thus, the bit transits to a condition $\underline{2_{L'}\text{-}1}$.

A left-hand condition $\underline{2_{L'}\text{-}1}$ remains as it is.

As a result, there develops a condition $3_L$ shown in FIG. 13 regardless of Hb ↓.

The foregoing explanation was made on the first and second layers both having the composition of magnetic material which exhibits no compensation temperature $T_{comp.}$ between the room temperature and the Curie point. In the presence of the compensation temperature $T_{comp.}$, the more complex explanation will be needed because of the facts that when the medium temperature exceeds the compensation temperature $T_{comp.}$, (1) the direction of magnetization is reversed and (2) the A and P types of medium operate in opposite manners to each other. Also, the direction of the recording magnetic field Hb is reversed as compared with the direction stated above when considering conditions at the room temperature.

In both the first and second embodiments, the recording medium preferably comprises the recording layer (first layer) and the reference layer (second layer) which are each formed of an amorphous ferrimagnetic material selected from alloy compositions of a transition metal (e.g., Fe or Co)—a heavy rare earth metal (e.g., Gd, Tb, Dy, etc.).

Where both the first and second embodiments are selected from alloy compositions of a transition metal—a heavy rare earth metal, the direction and magnitude of magnetization appearing to the outside for each alloy depends on the relationship between the direction and magnitude of spin of the transition metal (hereinafter referred to as TM) and the direction and magnitude of spin of the heavy rare earth metal (hereinafter referred to as RE) inside the alloy. For example, the direction and magnitude of spin of TM are indicated by a dotted vector ↑, the direction and magnitude of spin of RE are indicated by a solid vector ↑, and the direction and magnitude of magnetization of the whole alloy are indicated by a doubled solid vector ⇑. On that assumptions, the vector ⇑ is expressed by the sum of the vector ↑ and the vector ↑. Within the alloy, however, the vector ↑ and the vector ↑ are always directed opposite to each other because of the mutual interaction between the TM and RE spins. Accordingly, when those two vectors are equal in their magnitudes, the sum ↓ and ↑ or the sum ↓ and ↑, i.e., the vector of the alloy, becomes zero (meaning that the magnitude of magnetization appearing to the outside becomes zero). The alloy composition which makes the vector of the alloy zero is called a compensation composition. Other than the compensation composition, the alloy exhibits the intensity of spin corresponding to the difference in intensity between both the spins, and has a vector (⇑ or ⇓) directed in the same direction as either vector having a larger magnitude. The magnetization of this vector appears to the outside. For example, ↑ ↓ results in ⇑ and ↑ ↓ results in ⇓.

When either one magnitude of the vectors of the TM and RE spins at some compensation composition is larger than the other, that compensation composition is called 00 rich, e.g., RE rich, after the spin which has the larger intensity.

The first and second layers are each divided to a TM rich composition and an RE rich composition. Accordingly, given that the ordinate represents a composition of the first layer and the abscissa represents a composition of the second layer, the types of media of the basic invention can be grouped into four quadrants as a whole, as shown in FIG. 15. The above-mentioned P type belongs to the I and III quadrants, while the A type belongs to the II and IV quadrants. Incidentally, the cross point of the axes of ordinate and abscissas in FIG. 15 represents the compensation composition for the first and second layers.

Meanwhile, looking over changes of the coercivity with respect to temperature changes, some alloy composition has such characteristics that the coercivity is once increased infinitely and then decreased before reaching the Curie point (i.e., the temperature at which the coercivity is zero). The temperature corresponding to such infinite is called a compensation temperature ($T_{comp.}$). Considering TM rich alloy compositions, the compensation temperature is not present between the room temperature and the Curie point. Since the compensation temperature lower than the room temperature is meaningless in the magnetooptic recording, the compensation temperature referred to in this specification implies the one between the room temperature and the Curie point.

Recording media are grouped into four types as regards to the presence or absence of the compensation temperatures of the first and second layers. Those media belonging to the I quadrant include all of the four types. Graphs representing the relationship between the coercivity and the temperature of the four types of media can be plotted as shown in FIGS. 16 to 19, respectively. Note that a thin line stands for the relationship of the first layer and a fat line stands for the relationship of the second layer in each drawing.

Here, recording media can be grouped into the following nine classes as a result of dividing the recording layer (first layer) and the reference layer (second layer) depending on whether they are RE rich or TM rich, and whether they have the compensation temperatures or not.

TABLE 1

| Class | | | Type |
|---|---|---|---|
| I quadrant (P type) | | | |
| 1st layer: RE rich | 2nd layer: RE rich | | |
| 1 | having $T_{comp}$. | having $T_{comp}$. | 1 |
| 2 | having no $T_{comp}$. | having $T_{comp}$. | 2 |
| 3 | having $T_{comp}$. | having no $T_{comp}$. | 3 |
| 4 | having no $T_{comp}$. | having no $T_{comp}$. | 4 |
| II quadrant (A type) | | | |
| 1st layer: RE rich | 2nd layer: TM rich | | |
| 5 | having $T_{comp}$. | having no $T_{comp}$. | 3 |
| 6 | having no $T_{comp}$. | having no $T_{comp}$. | 4 |
| III quadrant (P type) | | | |
| 1st layer: TM rich | 2nd layer: TM rich | | |
| 7 | having no $T_{comp}$. | having no $T_{comp}$. | 4 |
| IV quadrant (P type) | | | |
| 1st layer: TM rich | 2nd layer: RE rich | | |
| 8 | having no $T_{comp}$. | having $T_{comp}$. | 2 |
| 9 | having no $T_{comp}$. | having no $T_{comp}$. | 4 |

The recording media of the basic invention are problematic requiring the initial auxiliary magnetic field Hini. to perform an overwriting and hence requiring a special recording apparatus provided with means for applying the initial auxiliary magnetic field Hini. Thus, there has been the problem that recording cannot be made on the media of the basic invention by using ordinary recording apparatus of non-overwrite type.

On the other hand, for the purpose of protecting disk-like media (incapable of overwriting) from dust and risk of damages or flaws, it has been conventionally proposed to accommodate them in cartridges. If the disk-like medium of the basic invention is accommodated in a cartridge, the medium would be spaced away from the Hini. applying means provided in the recording apparatus, resulting in the second problem that the Hini. applying means such as a permanent magnet or electromagnet would be increased in size.

In view of the above, a previously invented cartridge accommodates therein a disk-like magnetooptic recording medium capable of overwriting, and has built-in means for applying the initial auxiliary magnetic field Hini. (Japanese Patent Laid-Open No. 64-46247 and Japanese Patent Laid-Open No. 63-291237=U.S. Pat. No. 4,908,809).

The Hini. applying means built in the cartridge may be a permanent magnet or electromagnet. The former is more preferable.

Further, the Hini. applying means may be also used as means for applying the recording magnetic field Hb (see Embodiments 1, 2 and 8 of the basic invention described in U.S. Ser. No. 453,255 filed on Dec. 20, 1989 and Japanese Patent Application No. 61-294499=Japanese Patent Laid-Open No. 63-148446), or may be means for applying a magnetic field continuously changing from Hini. to Hb (Japanese Patent Application No. 62-120642=Japanese Patent Laid-Open No. 63-285740 corresponding to U.S. Pat. No. 4,910,622).

Recently, with an increasing demand for a larger storage capacity of media, there has been developed a magnetooptic recording medium of double face type comprising two pieces of single face type media bonded to each other using an adhesive. Following such a demand, double face type media capable of overwriting have been also developed.

In view of the above, a trial cartridge with Hini. applying means built therein to be adapted for media of double face type was fabricated. Hereinafter, the medium on one side of the double face type will be called an A medium and the medium on the other side thereof a B medium.

However, it was found that the trial cartridge could satisfactorily perform recording and reproduction on the side of the A medium, but failed to perform reproduction on the side of the B medium. This is the problem to be solved by the present invention.

SUMMARY OF THE INVENTION

As a result of researching the cause bringing about an incapability of the reproduction on one side of the medium, the inventor found that a reproduction signal (electric signal) was reversed. In other words, the trial cartridge operated to reproduce a bit in "the A direction" and a bit in "the counter-to-A direction".

Continuing to clear up that cause, it was found that because of a single permanent magnet provided as the means for applying the initial auxiliary magnetic field Hini., the direction of magnetization of the second layer in the initialized A medium was the same as the direction of magnetization of the second layer in the initialized B medium and, therefore, the directions of magnetization of bits in the respective first layers were opposite to each other between the A medium and the B medium upon the impingement of a laser beam for reproduction which was always irradiated from the one side.

As a result of further intensive research, the inventor accomplished the present invention based on findings that the above problem can be solved by making both the A and B media have the same direction of magnetization of the second layer when initialized as seen from the side of the impingement of the laser beam (used for both recording and reproduction with different levels of the intensity), and this is achieved by providing two permanent magnets as Hini. applying means dedicated for the A and B media, respectively, in such a manner as for the two permanent magnets to produce their magnetic fields direction opposite to each other.

Specifically, the present invention provides a magnetooptic recording medium cartridge which accommodates a double face type magnetooptic recording medium capable of overwriting, wherein two initial auxiliary magnetic field (Hini.) applying means (two permanent magnets) are built in the cartridge to produce magnetic fields directed opposite to each other.

With the cartridge of the present invention, the A and B media are opposite to each other in the direction of magnetization of the second layer when initialized. However, when the cartridge is loaded into a recording apparatus in use, the respective second layers of the A and B media are magnetized in the same direction as seen from the side of the impingement of a laser beam, because the incidence direction of the laser beam is always constant.

Therefore, the recording and reproduction can be performed on both sides of the A and B media in a like way.

DESCRIPTION OF THE PREFERRED EMBODIMENTS

The present invention will be described in detail hereinafter by referring to preferred embodiments, but it is not limited to these embodiments.

Embodiment ... Cartridge

Figure 1:
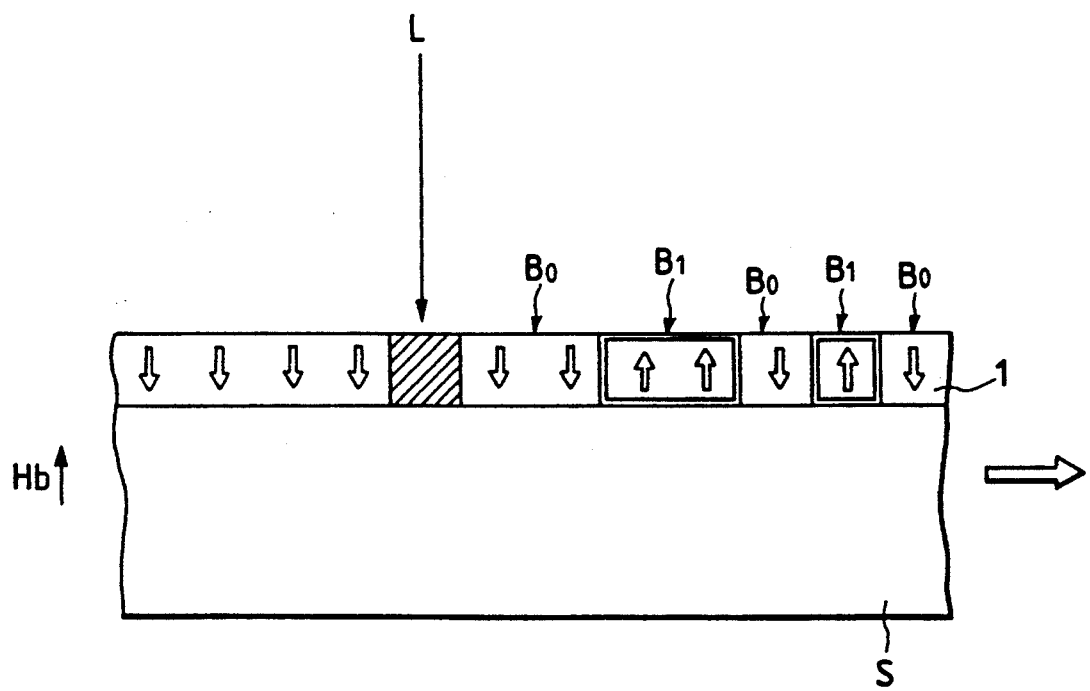
FIG. 1 is a conceptual view for explaining the recording principles of a magnetooptic recording technique.
Figure 2:
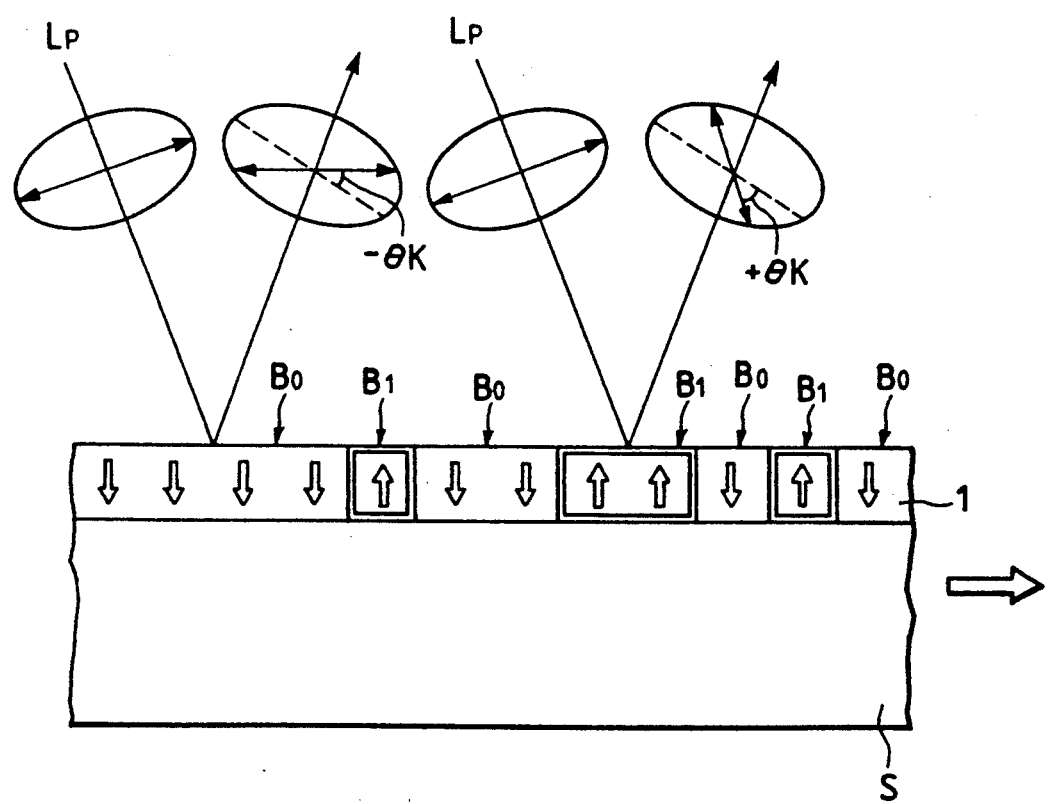
FIG. 2 is a conceptual view for explaining the reproducing principles of a magnetooptic recording technique.
Figure 3:
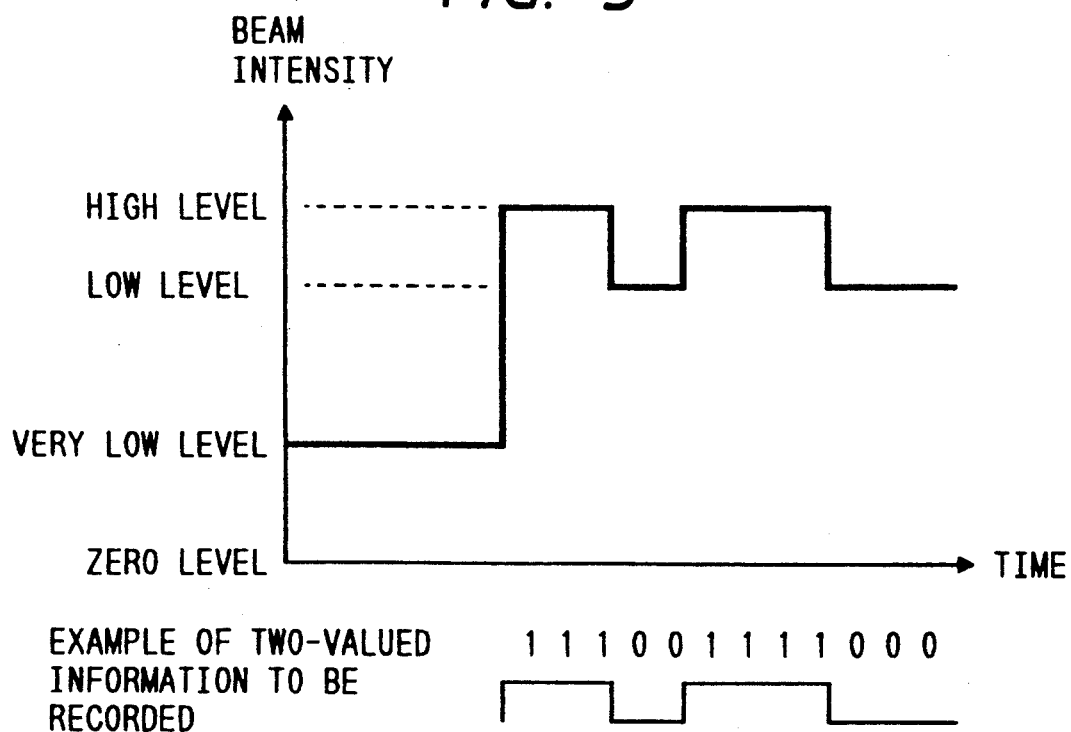
FIGS. 3 and 4 are charts showing the output waveforms of laser beams.
Figure 4:
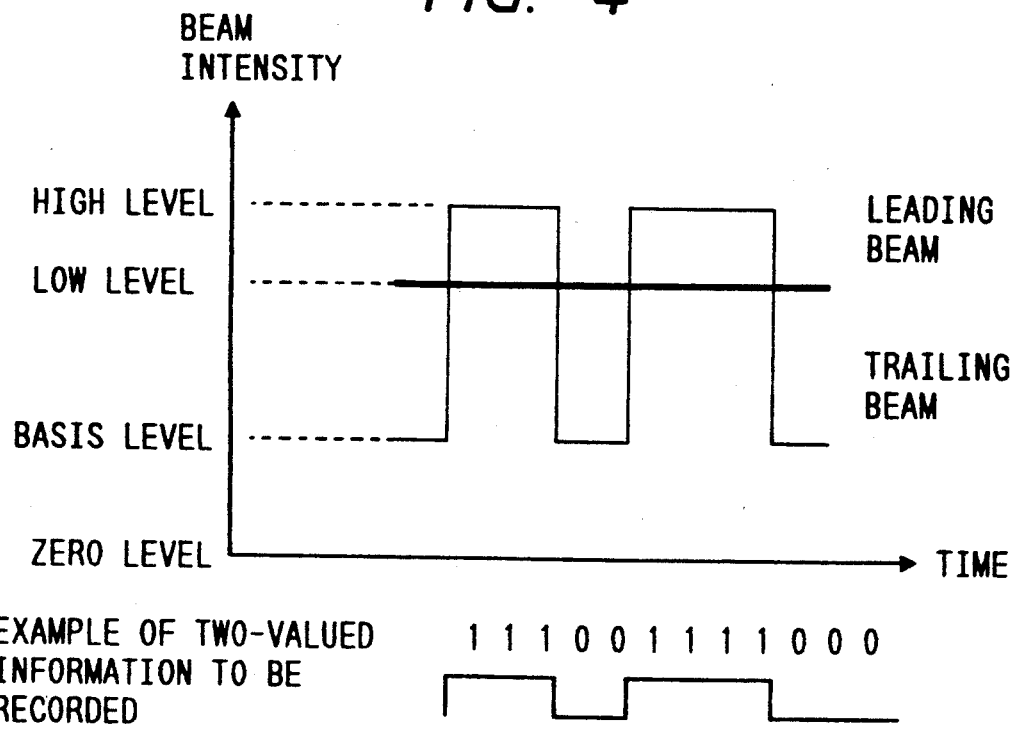
Figures 5, 6:
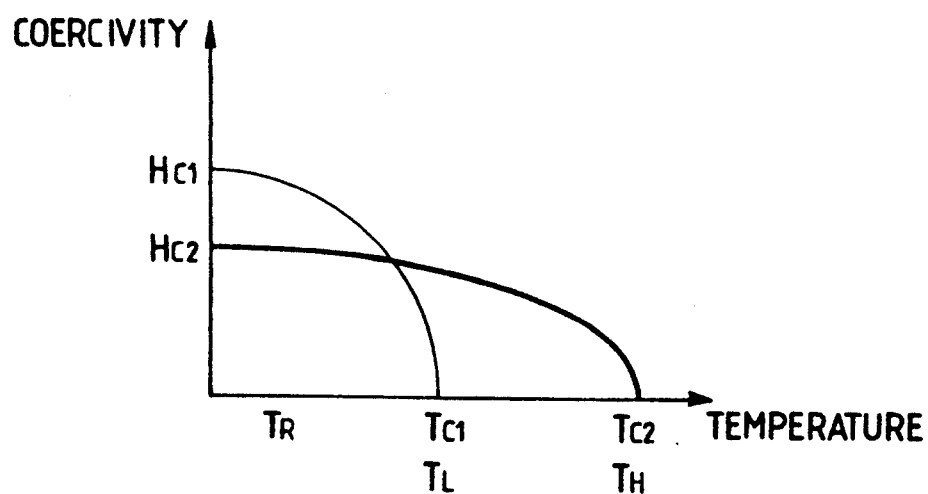
FIG. 5 is a diagram showing a multi-layered structure of a recording medium.
FIG. 6 is a graph showing the relationship between coercivity and temperature.
Figures 7, 8:
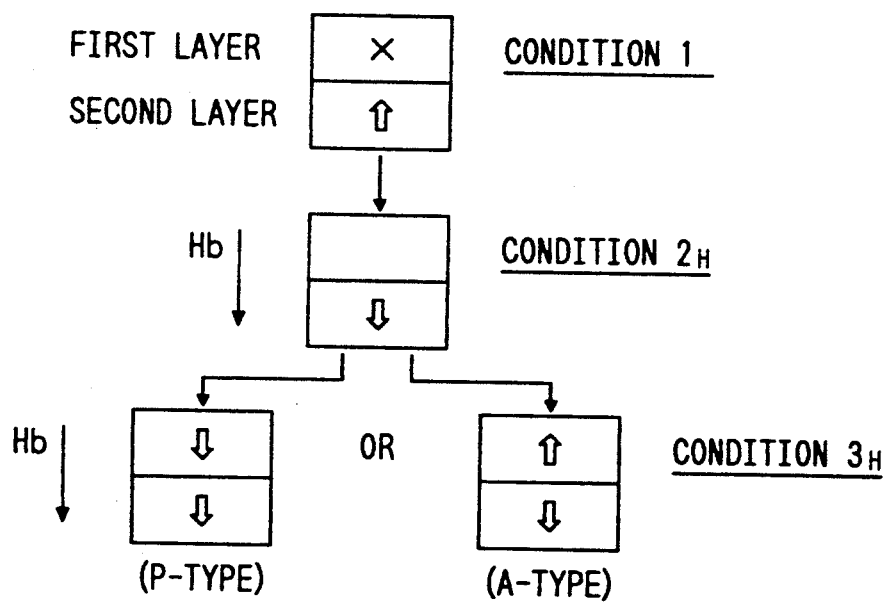
FIG. 7 is a diagram showing examples of the direction of magnetization of first and second layers in the medium.
FIG. 8 is a diagram showing changes in the direction of magnetization in a high temperature cycle with a first embodiment of the basic invention.
Figure 9:
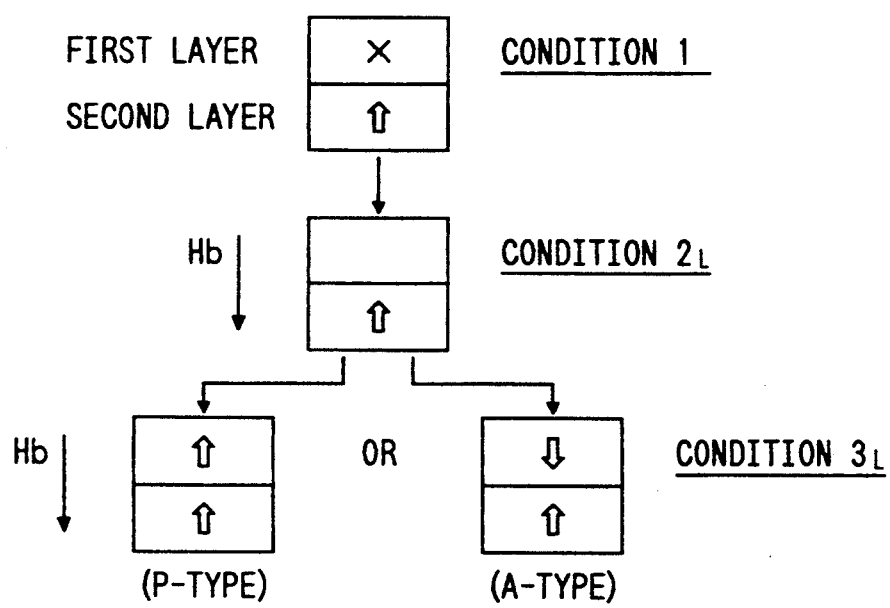
FIG. 9 is a diagram showing changes in the direction of magnetization in a low temperature cycle with the first embodiment of the basic invention.
Figure 10:
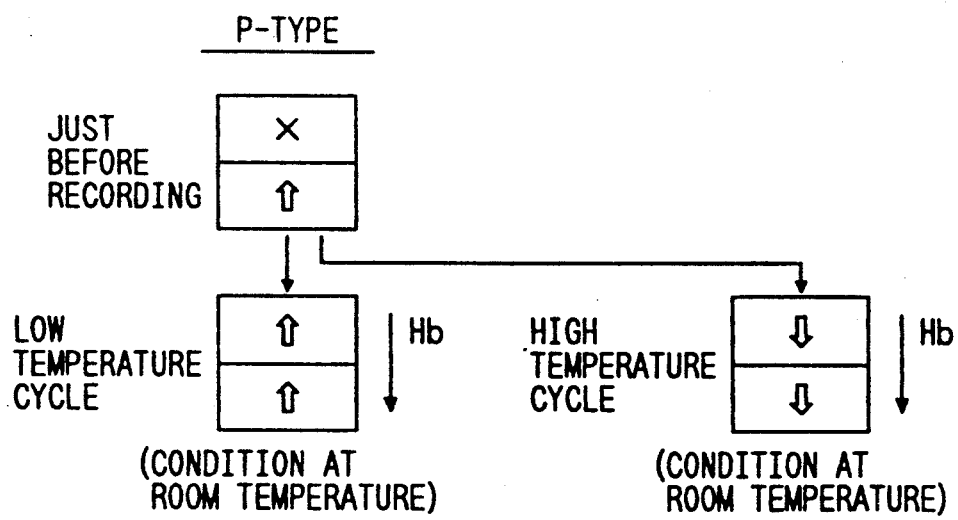
FIG. 10 is a diagram showing changes in the direction of magnetization of a P type medium in the low temperature cycle and the high temperature cycle.
Figure 11:
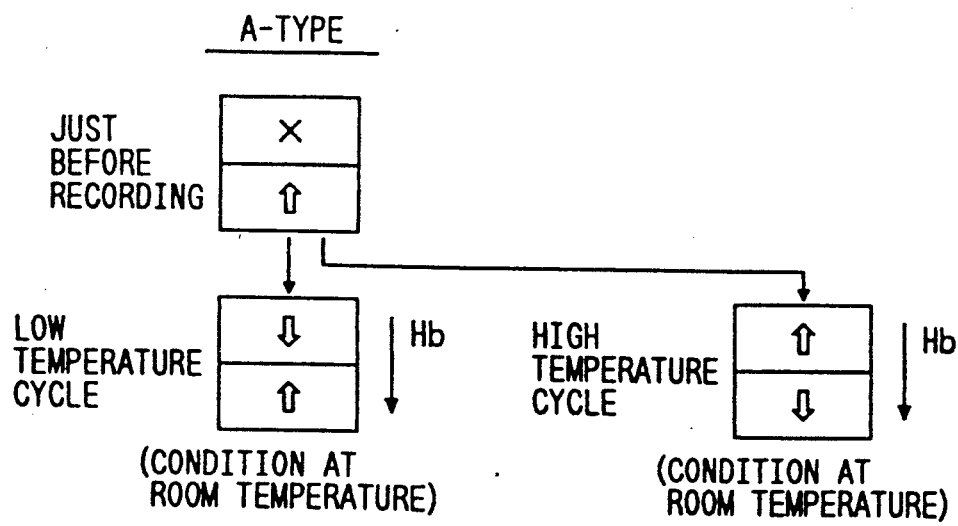
FIG. 11 is a diagram showing changes in the direction of magnetization of an A type medium in the low temperature cycle and the high temperature cycle.
Figure 12:
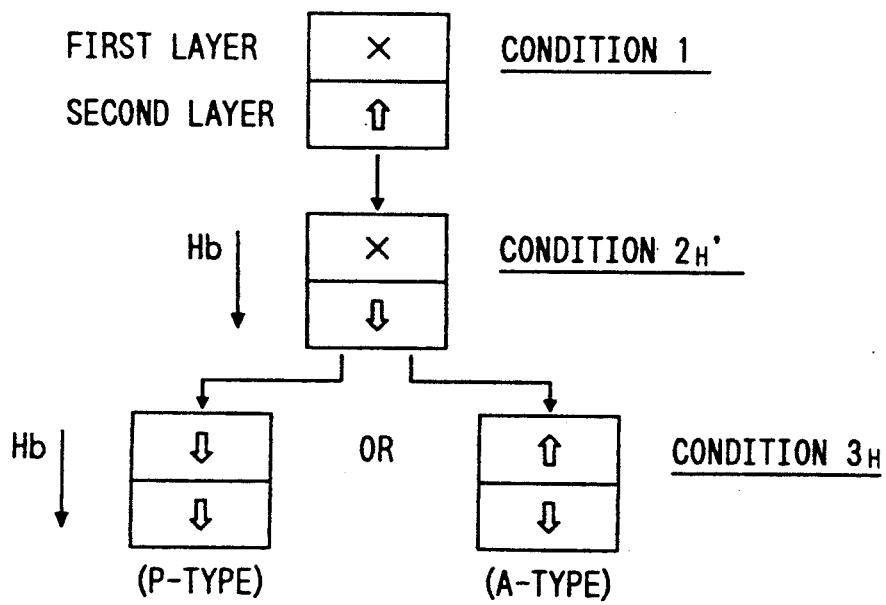
FIG. 12 is a diagram showing changes in the direction of magnetization in a high temperature cycle with a second embodiment of the basic invention.
Figure 13:
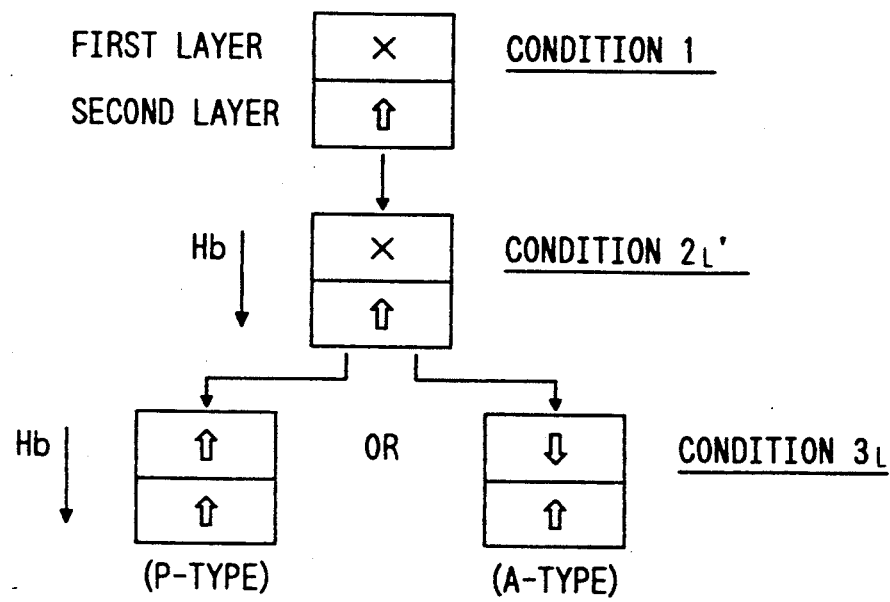
FIG. 13 is a diagram showing changes in the direction of magnetization in a low temperature cycle with the second embodiment of the basic invention.
Figure 14:
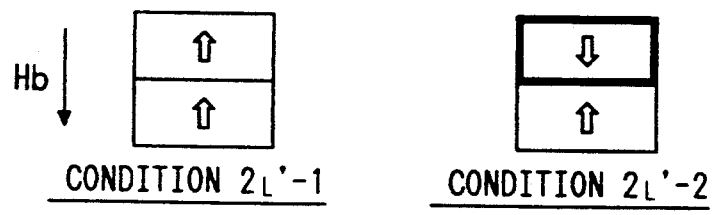
FIG. 14 is a diagram showing two types of bit under a condition $2_{L'}$.
Figure 15:
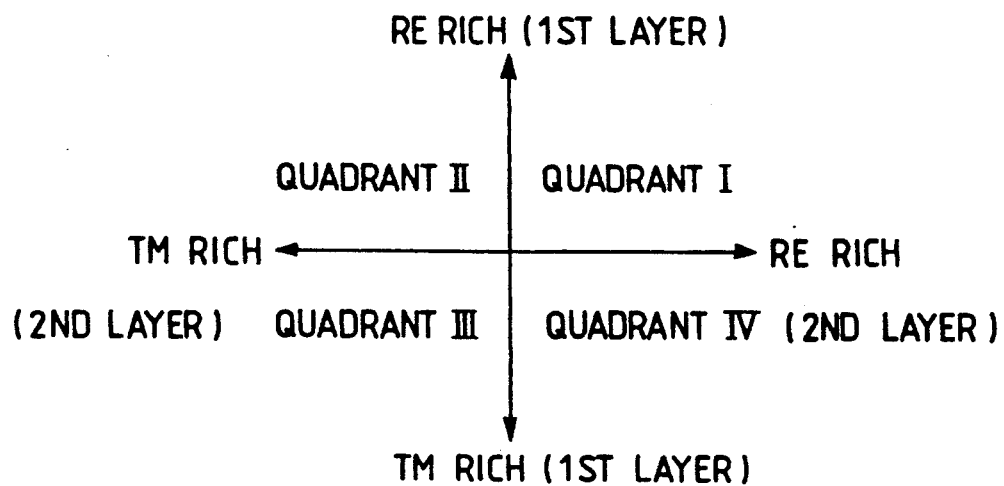
FIG. 15 is a map showing the types of media divided into four groups.
Figure 16:
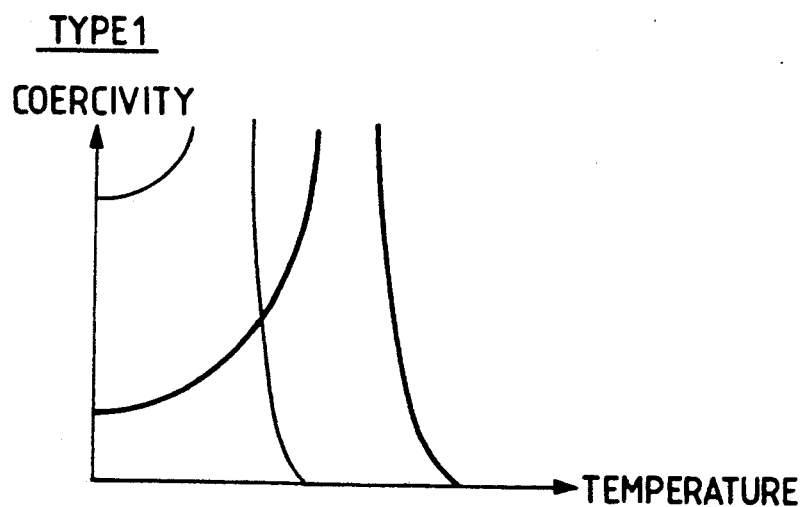
FIGS. 16 to 19 are graphs showing the relationship between coercivity and temperature for the four types of media, respectively.
Figure 17:
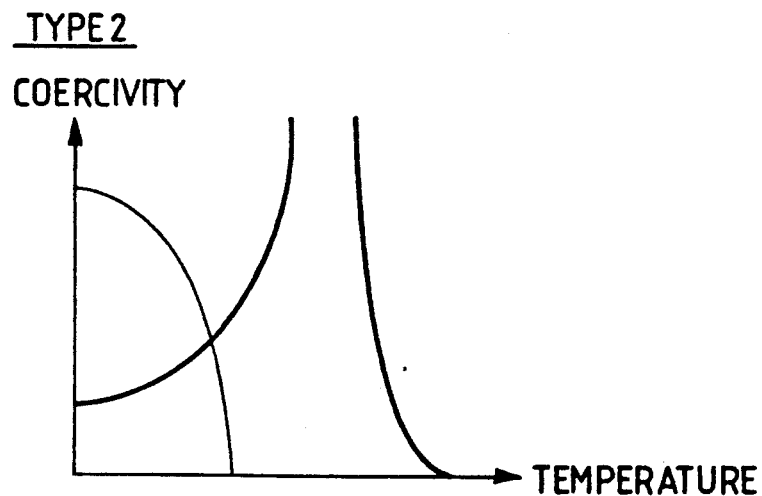
Figure 18:
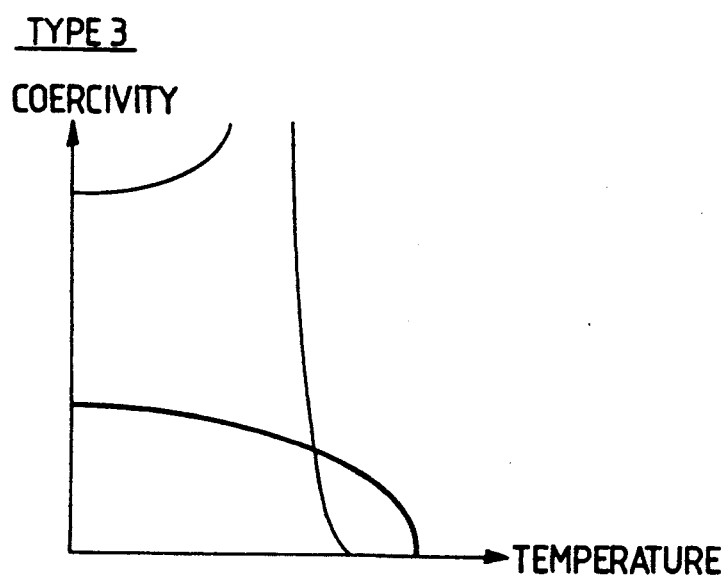
Figure 19:
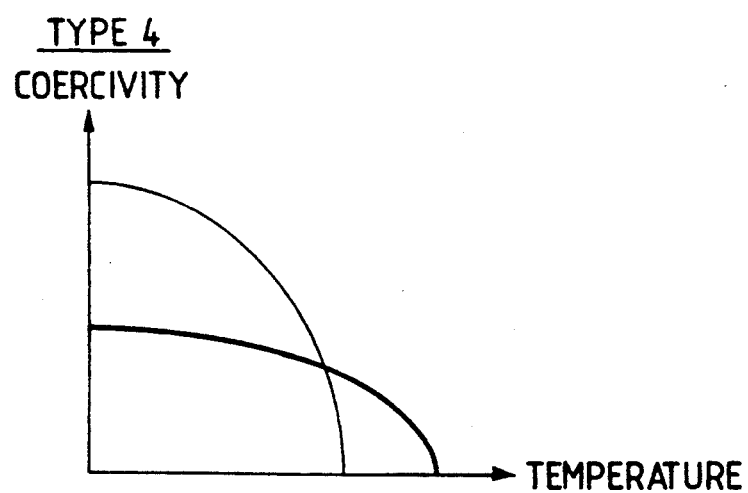
Figure 20:
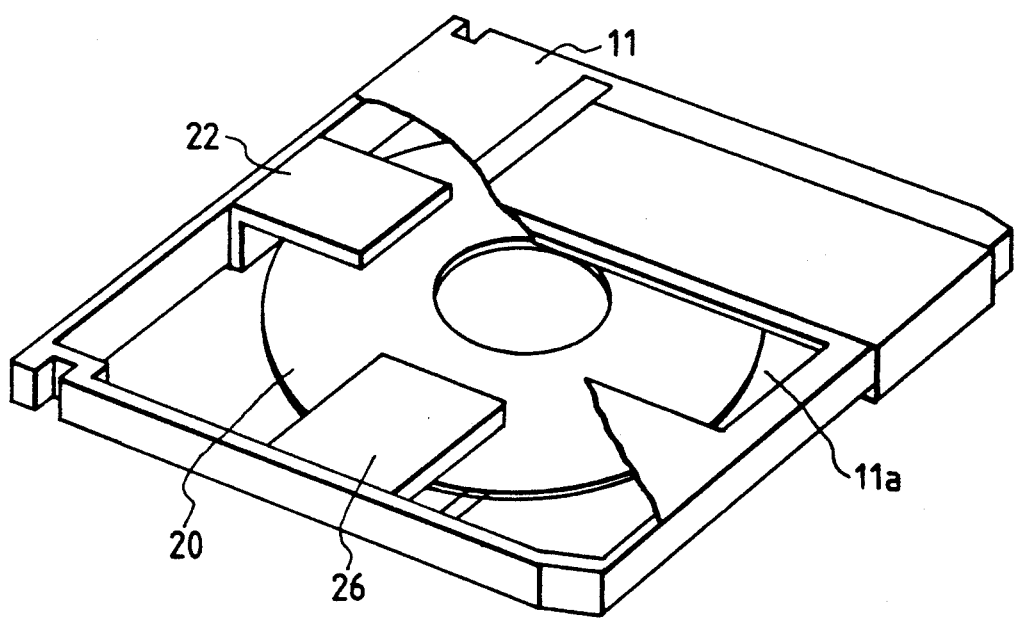
FIG. 20 is a schematic perspective view, partially broken away, of a cartridge according to an embodiment of the present invention.

FIG. 20 is a schematic perspective view, partially broken away, of a cartridge according to one embodiment.

Figure 21:
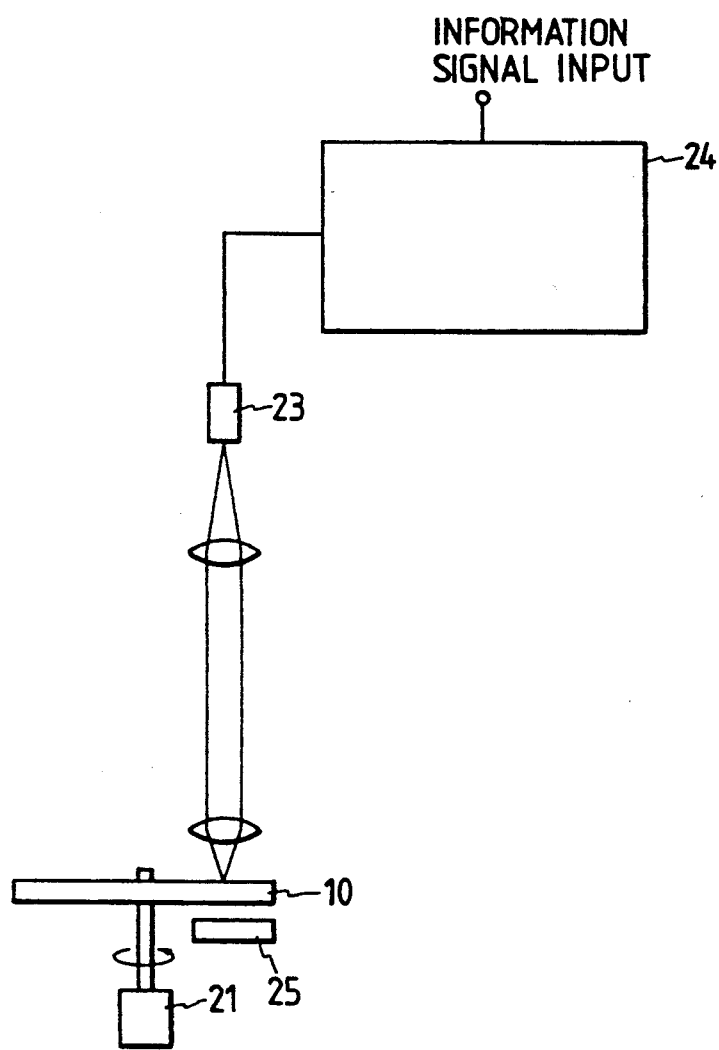
FIG. 21 is a conceptual view for explaining primary part of a conventional magnetooptic recording apparatus.

A magnetooptic recording medium 20 capable of overwriting is rotatably supported on a shaft in a cartridge body 11 of predetermined size. The shaft is directly or indirectly connected to a coupler exposed to the outside of a cartridge 10 (FIG. 21). By joining that coupler to another coupler on the side of a recording apparatus, torque (rotative power) can be transmitted to the shaft from rotating means 21 in the recording apparatus for rotating the medium.

Depending on cases, the rotating means 21 may be also built in the cartridge body 11.

Hini. applying means 22 and 26 each comprise a permanent magnet having a channel-like shape in cross-section with the medium sandwiched between two legs of the channel-like magnet. The Hini. applying means 22 is dedicated for the A medium (mentioned before) and the Hini. applying means 26 is dedicated for the B medium. While either means produces a magnetic field with the intensity of 4000 Oe, the produced magnetic field is arranged such that when the A medium is set to face up (i.e., when the medium 20 is directed so as for a laser beam to enter the first layer (mentioned before) of the A medium), the means 22 produces the magnetization in "the A direction" ↑ and the means 26 produces the magnetization in "the counter-to-A direction" ↓, each magnetic field covering an entire record area of the disk-like medium 20 in the radial rection. Incidentally, the Hini. applying means 22 and 26 are each fixed in place.

In part of the cartridge body 11, there is defined a window 11a (which may be replaced by an opening which can or cannot be opened and closed) in each of the obverse side (A side) and the reverse side (B side) of the cartridge body 11. The laser beam is irradiated to the medium through either window. Further, means 25 installed in the recording apparatus for applying a recording magnetic field Hb applies Hb to the irradiated portion of the medium.

The medium used in this embodiment is one type of the media explained before and was fabricated as follows.

Manufacture Method of Medium

A glass substrate is prepared which has a number of concentric grooves formed on the surface with a depth of 1100 Å and a pitch of 1.6 μm, for example, the glass substrate having a thickness of 1.2 mm and a diameter of 200 mm. On the other hand, a two-dimensional electron beam heating type vacuum evaporation apparatus is used with evaporation sources, shown in Table 2 below, placed at respective two locations.

Then, the glass substrate is set in a chamber of the vacuum evaporation apparatus. The interior of the apparatus chamber is once evacuated to a high degree of vacuum less than $1 \times 10^{-6}$ Torr. Following that, evaporation (vapor deposition) is carried out at an evaporation rate of about 3 Å/sec while keeping the degree of vacuum in a range of 1 to $2 \times 10^{-6}$ Torr. The first layer (recording layer) of $Gd_{23}Tb_3Fe_{74}$ (note: suffix number stands for atom %) with a thickness of

TABLE 2

|  | 1st Layer | 2nd Layer |
| --- | --- | --- |
| Evaporation Source (two-dimensional) | GdTb alloy Fe | Tb FeCo alloy |
| Thickness t (Å) | 500 | 1000 |
| Ms (emu/cc) | 90 | 180 |
| Hc (Oe) | 8000 | 3000 |
| Tc (°C.) | 150 | 200 |
| $T_{comp.}$ (°C.) | 120 | none |
| σw (room temp.) | 1.0 erg/cm² | |

500 Å is thereby formed on the substrate. Subsequently, the evaporation source is replaced by another one while keeping a vacuum condition. Evaporation is then carried out again to form the second layer (reference layer)

of $Tb_{28}Fe_{65}Co_7$ with a thickness of 1000 Å on the first layer. The first and second layers are each a perpendicular magnetic layer.

In this way, a two-layer magnetooptical recording medium belonging to the class 3 (P type·I quadrant ·type 3) is manufactured.

Figure 22:
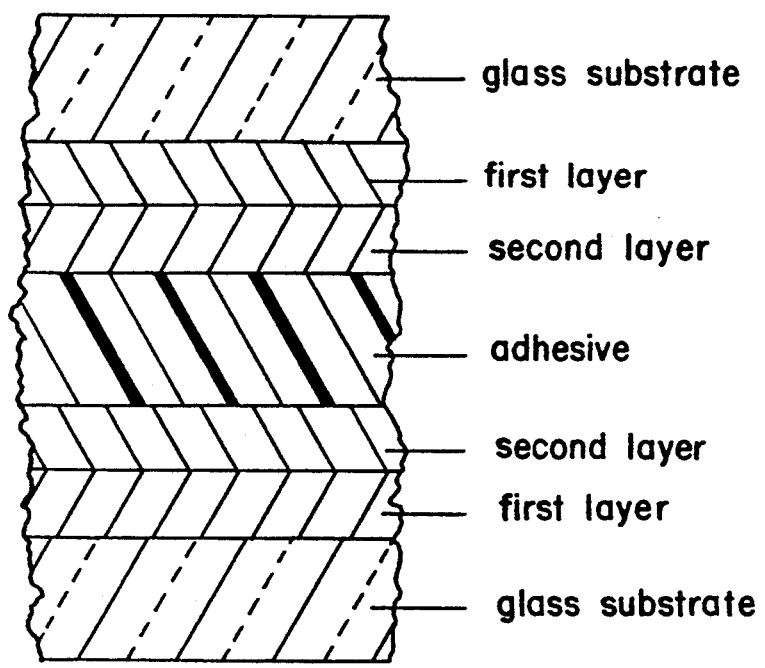
FIG. 22 is a fragmentary diagrammatic cross-section of a recording medium according to the invention.

By preparing two pieces (A and B media) of two-layer magnetooptical recording medium of single face type fabricated as in the above, and then bonding them by the use of a thermosetting adhesive with their second layers facing to each other, there is fabricated, as shown in FIG. 22 (not to scale), a disk-like magnetooptical recording medium which is of double face type and capable of overwriting.

Given $T_L = 170°$ C. and $T_H = 220°$ C. (see Usage Example), the thus-fabricated medium satisfies the following equation;

$$T_R < T_{comp.1} < T_{C1} \approx T_L < T_{C2} \approx T_H$$

and the following equation:

$$H_{C1} = 8000 \text{ Oe} > H_{C2} + \frac{\sigma w}{2M_{S1}t_1} + \frac{\sigma w}{2M_{S2}t_2} = 4389 \text{ Oe}$$

Moreover, since there hold:

$$H_{C2} + \frac{\sigma w}{2M_{S2}t_2} = 3278 \text{ Oe}$$

$$H_{C1} - \frac{\sigma w}{2M_{S1}t_1} = 6889 \text{ Oe}$$

the medium also satisfies one of conditional equations for overwriting below on an assumption that the initial auxiliary magnetic field Hini. is 4000 Oe:

$$H_{C2} + \frac{\sigma w}{2M_{S2}t_2} < H_{ini.} < H_{C1} - \frac{\sigma w}{2M_{S1}t_1}$$

(where Hini. is an absolute value) As a result, the magnetization of the first layer will not be reversed by Hini. at the room temperature, and only the magnetization of the second layer is reversed thereby.

In addition, since the equations:

$$H_{C1} = 8000 \text{ Oe} > \frac{\sigma w}{2M_{S1}t_1} = 1111 \text{ Oe}$$

$$H_{C2} = 3000 \text{ Oe} > \frac{\sigma w}{2M_{S2}t_2} = 278 \text{ Oe}$$

are satisfied, both the layers remain magnetized in the same condition even after Hini. has been removed.

Consequently, by applying the initial auxiliary magnetic field of Hini.=4000 Oe in "the A direction" ↑ and applying the recording magnetic field of Hb=300 Oe in "the counter-to-A direction" ↓, an overwriting is enabled.

Reference Example ... Magnetooptic Recording Apparatus

This apparatus can perform not only recording but also reproduction, and its general configuration is shown in FIG. 21 (conceptual view). Note that a reproduction system is entirely omitted other than a laser beam.

The apparatus basically comprises;

(a) rotating means 21 to rotate a recording medium 20;
(b) a laser beam source 23;
(c) means 24 for pulse-modulating the intensity of a beam in accordance with two-valued information to be recorded, into (1) a high level for giving a medium temperature $T_H$ adapted to form either one of a bit having upward magnetization and a bit having downward magnetization, and (2) a low level for giving a medium temperature $T_L$ adapted to form the other bit; and
(d) means 25 for applying a recording magnetic field Hb.

In general, the means 25 for applying the recording magnetic field Hb comprises an electromagnet or preferably a permanent magnet. Depending on cases, the recording magnetic field Hb may be applied by utilizing a stray magnetic field produced from a portion of the recording medium other than recording tracks. In this case, the applying means 25 indicates an area in the perpendicular magnetic layer (first and second layers) of the recording medium 20 from which the stray magnetic field is produced.

Here, a permanent magnet producing the magnetic field of Hb=300 Oe and magnetized in "the counter-to-A direction" ↓ is used as the applying means 25. The permanent magnet 25 is in the form of a bar having a length corresponding to the radial extent of the disk-like medium 20, and is fixedly installed. The permanent magnet 25 will not be moved together with a recording head (pickup) including the beam source 23. This reduces the weight of the pickup and allows a high-speed access.

Incidentally, this recording apparatus is the same as usual magnetooptical recording apparatus except that the modulating means 24 has the specific beam intensity. A reproducing apparatus may be added to modify this recording apparatus into an apparatus adapted for both recording and reproduction.

Usage Example ... Magnetooptic Recording

Magnetooptic recording was implemented by using the magnetooptic recording apparatus (see FIG. 21) stated above in Reference Example. First, the cartridge 10 of the embodiment was set in the magnetooptic recording apparatus with the A side facing up, and the recording medium accommodated in the cartridge was rotated by the rotating means 21 at a constant linear speed of 8.5 m/sec.

Then, a laser beam was irradiated to the A medium. This beam was adjusted by the means 24 so as to produce an output of 8.9 mW (on disk) at the high level and an output of 6.6 mW (on disk) at the low level. The beam was pulse-modulated by the means 24 in accordance with information. Here, the information to be recorded was given by a signal having frequency of 5 MHz. Accordingly, the beam was irradiated to the medium while being modulated by the frequency of 5 MHz. It was believable that the signal of 5 MHz was thereby duly recorded. Afterward, as a result of reproducting the signal by the magnetooptic recording apparatus, it was found that the C/N ratio was 51 dB and the information was correctly stored.

Next, a signal having frequency of 2 MHz at this time was recorded as new information in the area of the medium in which the above information was already recorded. As a result of reproducing the new information in a like manner, the reproduced new information has the C/N ratio=54 dB. The error occurrence rate was $10^{-5}$ to $10^{-6}$. On this occasion, the signal of 5 MHz (the previous information) was not at all evident.

Consequently, it was confirmed that the medium was capable of overwriting.

Under the above conditions, the medium temperature reached $T_H=220°$ C. at the high level and $T_L=170°$ C. at the low level.

Then, after reversing or turning the cartridge 10 upside down and setting it in the magnetooptical recording apparatus with the B side facing up, an overwriting was attempted in a like manner and the completely same result was obtained.

According to the cartridge of the present invention, as described above, the storage capacity is doubled as compared with the single face type, and the recording can be made on both the A side (A medium) and the B side (B medium). Further, information can be recorded on either side by using a conventional recording (reproducing) apparatus of non-overwrite type as it is, and also can be reproduced from both the sides.

In addition, since the recording medium is accommodated in the cartridge, it is protected from dust and risk of damages or flows. Since the Hini. applying means is disposed in the cartridge, there is another advantage in that the Hini. applying means is positioned close to the recording medium, which eliminates the need of enlarging the Hini. applying means.

I claim:

1. A magnetooptic recording medium cartridge comprising:
    a hollow cartridge body;
    a rotatable magnetooptic disk recording medium having first and second recording medium sides and disposed within said body and capable of overwriting at each of said sides by a laser beam intensity-modulated in accordance with two-valued information, the laser beam impinging upon the first side or the second side of the medium through a corresponding window or opening in the body, along a beam path that remains the same irrespective of which side of the medium faces the impinging laser beam, while the medium is rotated in a direction, as seen from the side of the medium facing the laser beam, that remains the same irrespective of which side faces the laser beam; and
    two magnetic means disposed on said body to apply respective initial magnetic fields to said medium transversely thereto at predetermined positions along said medium that are spaced from each other circumferentially of said medium, said initial magnetic fields having polarities that are opposite to each other, one of said initial magnetic fields being effective to initialize one side of said recording medium sides and the other of said initial magnetic fields being effective to initialize the other side of said recording medium sides.

2. A magnetooptical recording medium cartridge according to claim 2, wherein said medium comprises a first pair of stacked first and second magnetic layers which forms said first recording medium side of said medium, and a second pair of stacked first and second magnetic layers which forms said second recording medium side of said medium, wherein said first magnetic layer is a recording layer and said second magnetic layer is a reference layer, said reference layer having magnetization direction initialized in a predetermined direction without changing the direction of magnetization of said first magnetic layer, by an initial magnetic field applied by a respective one of said two magnetic means during said overwriting, the arrangement of the first and second layers at each side of the medium being the same as seen from the side of the medium facing the laser beam.

* * * * *